May 21, 1963
E. W. JONES
3,090,666
ALKALINE SHRINKAGE OF COTTON FABRIC ON VIBRATORY CONVEYOR
Filed June 16, 1959
3 Sheets-Sheet 1
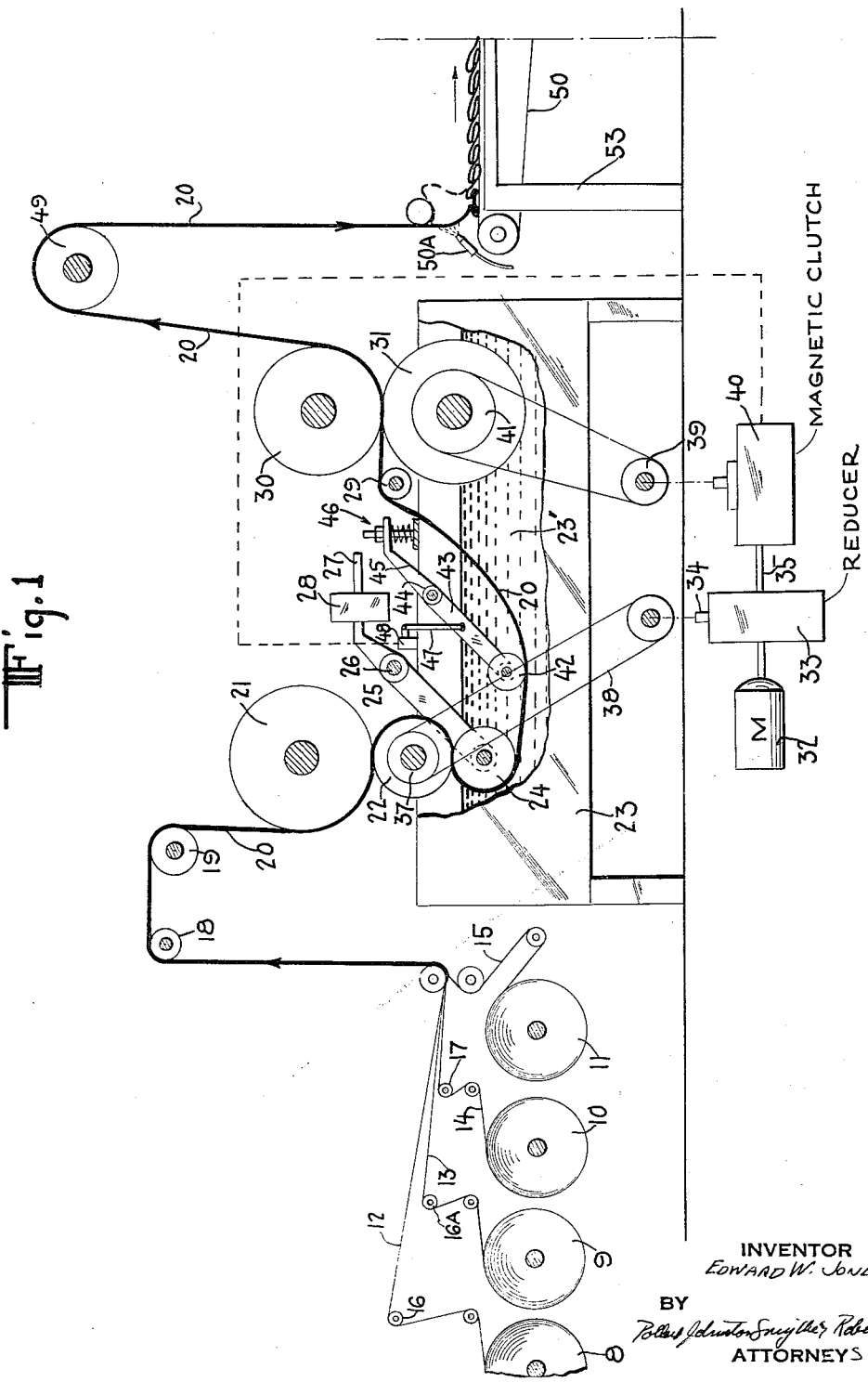
INVENTOR
EDWARD W. JONES
BY
ATTORNEYS

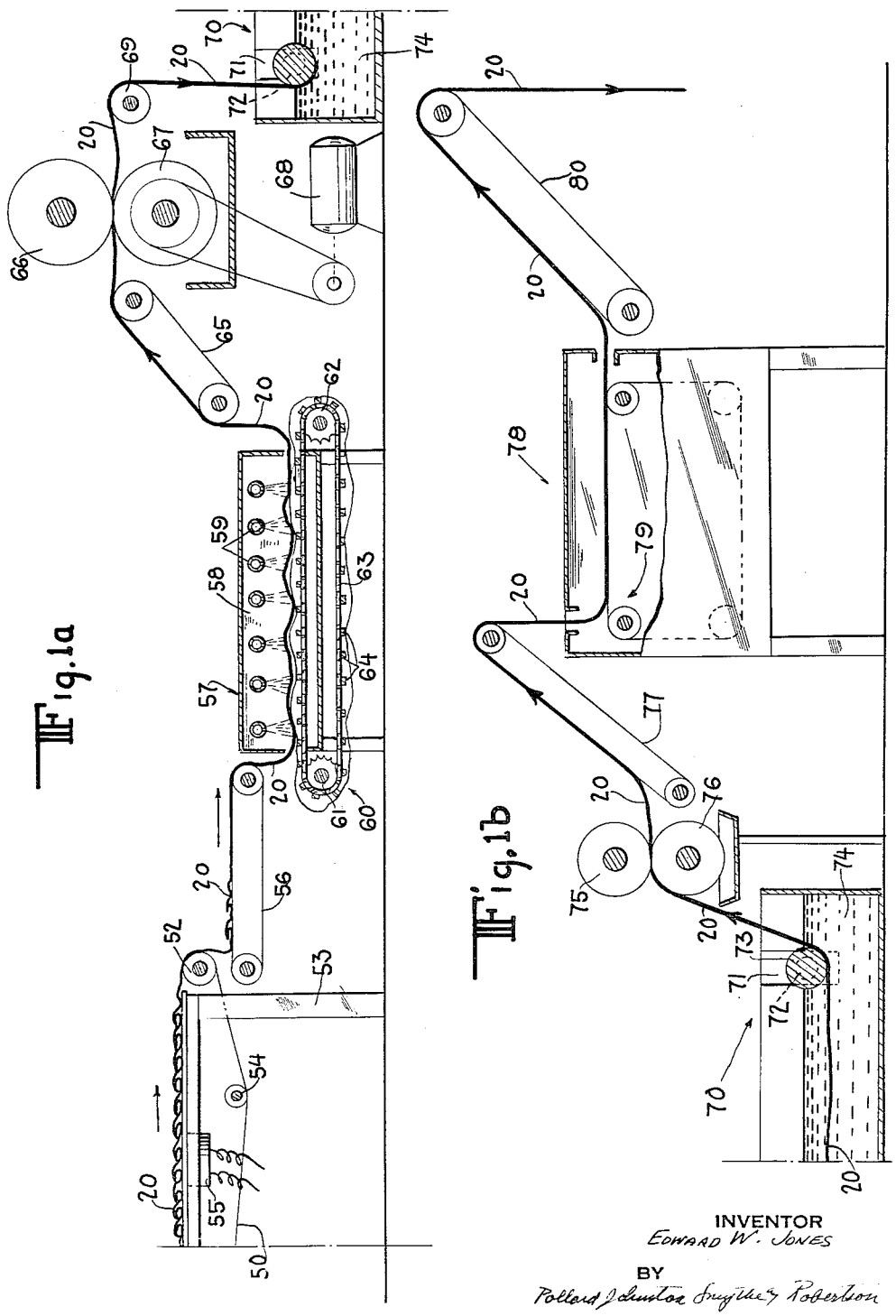

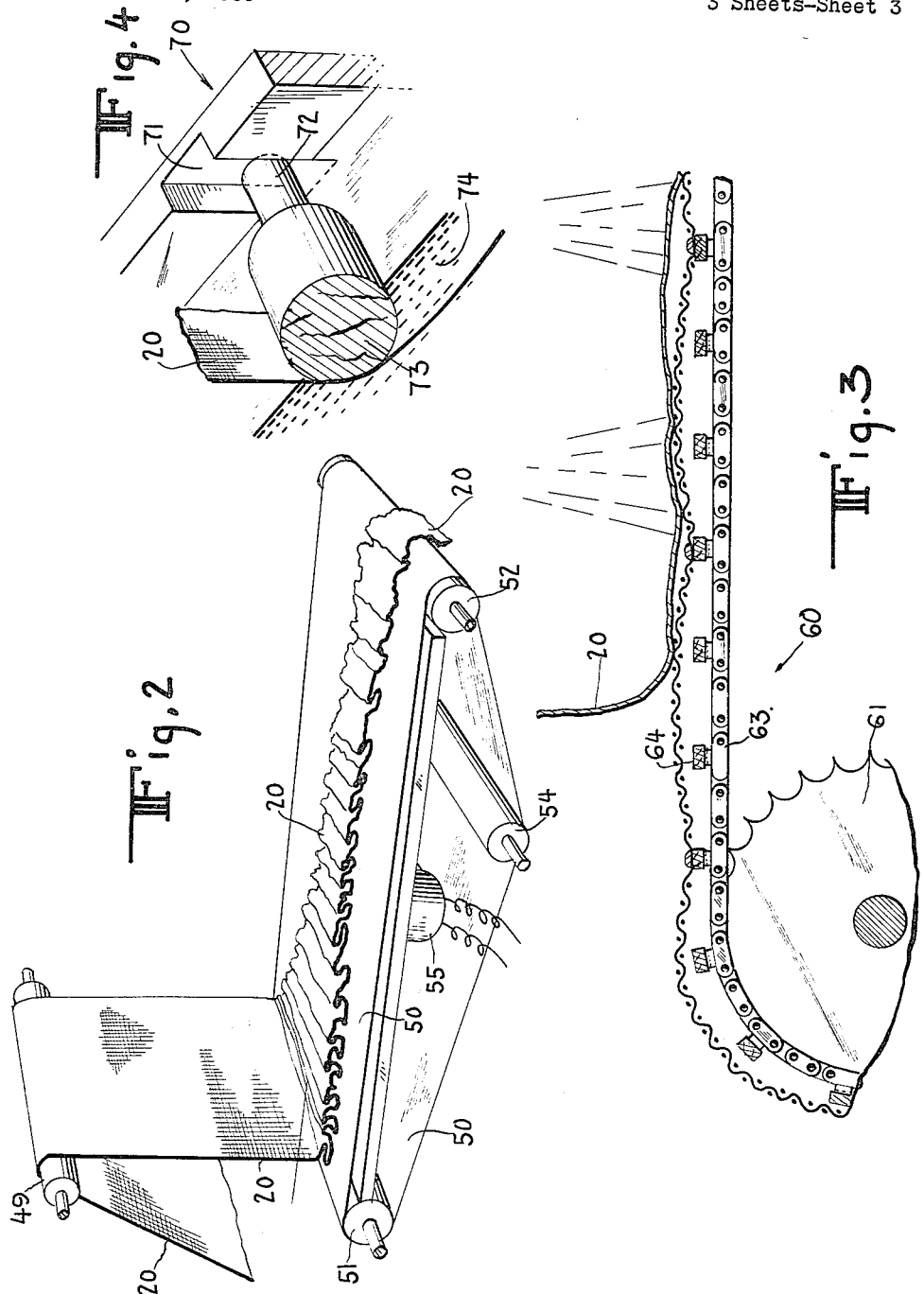

United States Patent Office 3,090,666
Patented May 21, 1963

3,090,666
ALKALINE SHRINKAGE OF COTTON FABRIC ON VIBRATORY CONVEYOR
Edward W. Jones, Waterville, N.Y., assignor to Elastic Fabric Co., Inc., New York, N.Y., a corporation of Delaware
Filed June 16, 1959, Ser. No. 820,813
2 Claims. (Cl. 8—125)

This invention relates to a process and apparatus for continuously producing a fabric having a high degree of stretchability and elasticity.

It has been proposed to produce a fabric having a high degree of stretchability and elasticity by dropping a quantity of fabric into a caustic or similar bath causing the swelling and kinking of the fibers of the cloth and consequent unrestricted shrinking of the cloth. It has also been proposed to produce fabric having a high degree of stretchability and elasticity in one direction of the fabric by allowing shrinking to take place in only one direction while restraint is exerted to prevent shrinking in the other direction, or permitting its free shrinking in both directions and stretching the fabric in only one direction to remove the elasticity in that direction.

These processes, and particularly that involving the production of fabric having stretchability and elasticity in both directions, require very careful handling of the fabric during the processing to prevent destruction of the elasticity of the fabric, and they have not been capable of manufacture in a continuous process on mechanized equipment.

One of the principal objects of this invention is to provide a continuous process of manufacturing fabrics having a high degree of stretchability and elasticity.

Another object is to provide such a process in which the stretchability and elasticity will occur in both lengthwise and crosswise directions.

Another object of the invention is to provide such a process in which the fabric is fed through the apparatus substantially tension-free in both directions of length and width of the fabric.

Another object of the invention is to provide such a process in which a plurality of continuous sheets of the fabric may simultaneously be continuously processed.

Another object of the invention is to provide such a process in which the fabric is fed in a continuous strip through a caustic or similar bath substantially tensionless, such that the fibers of the fabric absorb sufficient of the solution to cause the necessary shrinking but fast enough so that substantially little, if any, shrinking takes place in the bath.

Another object of the invention is to provide such a process in which the treated fabric is fed in a continuous strip to a shrinking table that subjects the strip to a vibrating action while conveying it therealong.

Another object of the invention is to provide such a process in which the shrunken treated fabric is fed in a continuous strip through a washing process in a tensionless manner to remove all traces of caustic or other treating material therein.

Another object of the invention is to provide such a process in which the washed fabric is fed in a continuous strip through a bleaching and/or a dyeing tank.

Another object of the invention is to provide such a process in which the treated fabric is fed in a continuous strip through a drying chamber from which it may be fed to a separating and storage apparatus.

Another object of this invention is to provide a process in which the steps enumerated above are successively performed in the above recited sequence.

Another object of the invention is to provide apparatus for performing the above continuous process of producing fabric having a high degree of stretchability and elasticity.

In one aspect of the invention, a plurality of reels of fabric such as cheesecloth, knit cloth, or the like may be simultaneously fed over a single roller in stacked layers, thence around a feeding roller such that a predetermined feeding action may be imparted to the fabric by a pivotally mounted roller that may be adjusted to vary the degree of wrap of the fabric about the feeding roller. The fabric may then extend in the form of a relatively free loop within a caustic bath, thence outwardly between other feeding roller means, the speed of which may be maintained in a predetermined relation to that of the first mentioned feeding roller so as to maintain the free loop within the caustic or treating bath. Furthermore, the rate of feed of the fabric through the bath may be, and preferably is, such as to permit absorption of sufficient caustic solution, treating solution or fiber shrinking solution by the fibers of the cloth to effect the desired shrinking action, but fast enough so that little, if any, shrinking occurs within the caustic bath.

In another aspect of the invention, the fabric containing the caustic solution may be fed over an idle roller in a manner to freely fall onto a continuously moving, vibratory conveyor where the vibratory action facilitates the tensionless shrinking of the fabric as the conveyor moves it along. The speed of the conveyor means relative to that of the cloth being fed is chosen so that the fabric is properly arranged thereon. Air can be directed onto the fabric as it falls onto the conveyor.

In still another aspect of the invention, the shrunken fabric may be fed onto a continuous belt conveyor within a washing chamber to remove the excess caustic or treating material therefrom. The conveyor may be so constructed that it will contact the fabric at a minimum number of points therealong so as not to stretch the fabric during the washing operation. While the washing operation may be effected in different ways, it is shown and will be described as a water spray that passes through the fabric while it is supported by the conveyor.

In still another apsect of the invention, the washed shrunken fabric may be fed into a bleaching bath or dyeing vat where it may be held beneath the surface of the bleach or dye by floating guide rolls that exert only sufficient force on the fabric to maintain it below the surface of liquid.

In still another aspect of this invention the bleached or dyed shrunken material may be fed through a drying chamber from which it may be fed to apparatus for separating the layers of fabric from each other, to a storing platform or bin, or to a further treating station.

The above, other objects and novel features of the invention will become apparent from the following specification and accompanying drawings which are merely exemplary.

In the drawings:

FIG. 1 is an elevational view of the caustic or treating bath and the apparatus for feeding the fabric therethrough to which certain of the principles of the invention have been applied;

FIG. 1a is an elevational view of the apparatus for vibratorily conveying the fabric from the bath of FIG. 1 to a washing chamber to which certain other principles of the invention have been applied;

FIG. 1b is an elevational view of the bleaching or dyeing bath and drying chamber to which certain other principles of the invention have been applied;

FIG. 2 is a perspective view of the vibratory conveying mechanism shown in FIGS. 1 and 1a;

FIG. 3 is an enlarged detail of a portion of the washing chamber of FIG. 1a; and FIG. 4 is a detail of the apparatus within the bleaching or dyeing bath of FIGS. 1a and 1b.

Referring to the drawings, and particularly to FIG. 1, a plurality of reels 8, 9, 10 and 11 of substantially identical size and containing substantially identical material such as a cotton fabric, e.g., cheesecloth, knit material, or the like, may be mounted in any suitable manner in alignment for paying off of the fabric in continuous strips 12, 13, 14 and 15. Idler rolls 16, 16A, 17 and 18 may be arranged to guide the strips 12, 13, 14 and 15 over a single roll 19 with the strips 12, 13, 14 and 15 in stacked relation and forming a composite strip 20 that may wrap to a predetermined degree about the periphery of a roll 21. The roll 21 may be mounted in strip driving relation with a feeding roll 22, both of which may be located over a tank 23 containing a caustic bath 23', such as sodium hydroxide or the like. A roll 24 may be journaled in bearings within a frame 25 that may be mounted for oscillatable motion about a pivot bearing 26. The frame 25 may include an arm 27 on which an adjustable counterweight 28 may be located. Varying the position of weight 28 will cause roll 24 to effect different degrees of wrap of the strip 20 about the driving roll 22 to provide a correct feeding action of the strip 20.

The strip 20 may be directed into the bath 23' as a substantially free loop so that no tension either crosswise or lengthwise will result. The strip 20 may then pass out from the bath 23' over an idle roll 29, thence between a roll 30 and another feeding roll 31, causing the squeezing out of excess caustic solution from the strip 20 as it is fed from said bath.

In order to maintain the tensionless free loop of strip 20, the feeding rolls 22 and 31 may be operated in a controlled fashion. A motor 32 may drive a speed reducer 33 having two output shafts 34 and 35. Shaft 34 may have a pulley 36 thereon which may be belted or otherwise drivingly connected to a pulley 37 on the shaft supporting roll 22 by a belt 38. The shaft 35 may drive a pulley 39 through a magnetic clutch 40. The pulley 39 may be drivingly connected to a pulley 41 on the shaft to which roll 31 is fixed.

A follower roll 42 may be mounted within a frame 43 that is mounted on a pivot bearing 44. The frame 43 may include an arm 45 that cooperates with an adjustable, resilient mounting 46 that normally maintains the roll 42 in a balanced condition in contact with strip 20 forming the free loop within bath 23'. A link 47 may connect frame 43 to an electrical switch 48 that is in series circuit with the magnetic clutch 40. Accordingly, any loss of the free loop of strip 20 within the bath 23' will de-energize the clutch 40, stopping the feeding action of roll 31 until said loop is again formed. In this way, a substantially tensionless free loop of strip 20 is maintained within the bath 23'. Other control systems and driving means can be used.

The strip 20 may be fed from the rolls 30, 31 over a roll 49, thence vertically onto a conveyor 50. Referring to FIGS. 1a and 2, the conveyor 50 may include rolls 51 and 52 at each end of a supporting table 53 (FIG. 1). An idler roll 54 may be provided, and one of the rolls 51 or 52 may be driven (by a means not shown) at a rate to convey the strip 20 away from the point where it is received by the conveyor 50 so that a build-up of material does not occur at this point and so that the cloth is properly bunched. If desired, air may be directed onto strip 20 from a suitable manifold 50A.

A vibrator may be provided for continuously vibrating the top stretch of the conveyor belt 50. In this way, the strip 20 is conveyed along the path between rolls 51 and 52 in what may be termed a "vibratorily suspended condition" so that there is substantially no resistance to the shrinking of the material of strip 20 as it passes along the path between the rolls 51 and 52. From an inspection of FIG. 2 it is evident that the fabric of strip 20 has not only shrunk lengthwise but crosswise also, and in a substantially uninhibited manner in both directions.

The shrunken material of strip 20 contains an excess of the caustic or treating solution which must be removed from it. Accordingly, the strip 20 may be fed from the conveyor 50 onto an intermediate conveyor 56 (FIG. 1a) that delivers the strip 20 to another conveyor within a washing chamber 57. As an example, the treating solution may be a 10–30% aqueous solution of sodium hydroxide.

The chamber 57 may comprise a housing 58 within which may be mounted parallel spaced water lines 59 arranged transversely of the path of travel of the strip 20. The lines 59 may include a plurality of jets for spraying water over the entire area of the strip 20 as it passes through the chamber 58.

In order to convey the strip 20 through the chamber 58 while still preserving the shrunken condition of the material as the jets of water are directed against it, a conveyor 60 (driven by means not shown) is provided. The conveyor 60 may be made up of two pairs of axially aligned, spaced sprockets 61 and 62 fixedly mounted on rotatable shafts located exteriorly of the chamber 58. Only one sprocket of each pair is shown in the drawings. Separate chains 63 (only one being shown) are mounted on a sprocket of each pair, and parallel, spaced, transversely arranged slats 64 are fixed to the chains 63 at equal intervals throughout their lengths. Loose mesh wire screen is carried by the slats. From the foregoing it is evident that washing water from the jets in lines 59 will pass through the strip 20, cleansing it of the excess caustic solution therein while subjecting the strip 20 to a minimum of contact between it and the conveyor 60.

The washed shrunken strip 20 may then lead to an auxiliary conveyor 65, thence to a pair of rolls 66 and 67 for squeezing the excess water from the material of strip 20 and for imparting a further feeding motion to the strip 20. Accordingly, the roll 67 may be rotated by a drive from a motorized gear reduction unit 68.

In order to bleach or dye the fabric of strip 20, it may be fed from rolls 66 and 67 over an idler roll 69, thence to a vat 70 containing a bleaching compound or dye. The vat 70 may include aligned slots 71 on opposite side walls of the vat for receiving trunnions 72 of floating rolls 73, the arrangement being such that the rolls 73 in floating always have a portion of their peripheries below the level of liquid 74 within the vat 70. Therefore, feeding the strip 20 beneath such a roll 73 at each end of the vat will maintain the strip below the level of the liquid 74 with a minimum of force tending to stretch the shrunken material of the strip 20 as it passes through the vat 70. The excess dye or bleaching liquid within the material of strip 20 as it leaves the vat 70 may be removed by feeding the strip 20 through two rolls 75 and 76 (driven by means not shown) which will squeeze the excess liquid from the strip 20. Means such as a conveyor 77 may be provided for feeding the strip 20 to a drying chamber 78 in which may be mounted an endless belt conveyor 79 that conveys the strip 20 past heat elements or heating means of any suitable character.

Finally, the completely processed, shrunken, stretchable, elastic, composite strip 20 may be fed by a conveyor 80 to a storage bin or apparatus for separating the individual shrunken layers 12, 13, 14 and 15 whichever is desired.

Although the various features of the new and improved process and apparatus for continuously producing fabric having a high degree of stretchability and elasticity have been shown and described in detail to fully disclose one embodiment of the invention, it will be evident that numerous changes may be made in such details, and certain features may be used without others without departing from the principles of the invention.

What is claimed is:

1. In a process for continuously producing a fabric having a high degree of stretchability and elasticity which comprises continuously feeding a running length of cotton fabric under tensionless conditions in all directions and in the form of a free loop through an alkaline bath at a rate sufficient to prevent any substantial shrinking of the fabric in said bath; vibratorily suspending said fabric while it shrinks after it leaves said bath to provide uninhibited shrinking thereof in all directions by continuously folding the fabric onto a long moving vibratory surface removed from any liquid surrounding, and carrying the folded fabric on the moving vibratory surface to a remote position.

2. In a process for continuously producing a fabric having a high degree of stretchability and elasticity which comprises continuously feeding a running length of cotton fabric under tensionless conditions in all directions and in the form of a free loop through an alkaline bath at a rate sufficient to prevent any substantial shrinking of the fabric in said bath; vibratorily suspending said fabric while it shrinks after it leaves said bath to provide uninhibited shrinking thereof in all directions by continuously folding the fabric in a relaxed state onto a long moving vibratory surface removed from any liquid surrounding, and shrinking the folded fabric by carrying the fabric on the moving vibratory surface to a remote position.

References Cited in the file of this patent

UNITED STATES PATENTS

| | | |
|---|---|---|
| 2,193,340 | McConnell | Mar. 12, 1940 |
| 2,325,545 | Redman | July 25, 1943 |
| 2,409,543 | Chatfield | Oct. 15, 1946 |
| 2,497,519 | Stevenson | Feb. 14, 1950 |
| 2,533,248 | Helmus | Dec. 12, 1950 |
| 2,558,066 | Wedler | June 26, 1951 |
| 2,705,881 | Greenwalt | Apr. 12, 1955 |
| 2,758,463 | Clarke | Aug. 14, 1956 |
| 2,773,295 | Glassford | Dec. 11, 1956 |
| 2,807,953 | Vergers | Oct. 1, 1957 |
| 2,831,233 | Cohn et al. | Apr. 22, 1958 |
| 2,445,504 | Williams | July 20, 1958 |
| 2,844,019 | Schurmann | July 22, 1958 |

FOREIGN PATENTS

| | | |
|---|---|---|
| 501,833 | Great Britain | May 29, 1936 |

OTHER REFERENCES

American Dyestuff Reporter, pp. 365–369, August 28, 1944.

Goldthwait et al.: Textile Research J., vol. XXV, No. 1, pp. 47–57, January 1955.